Figure 1:
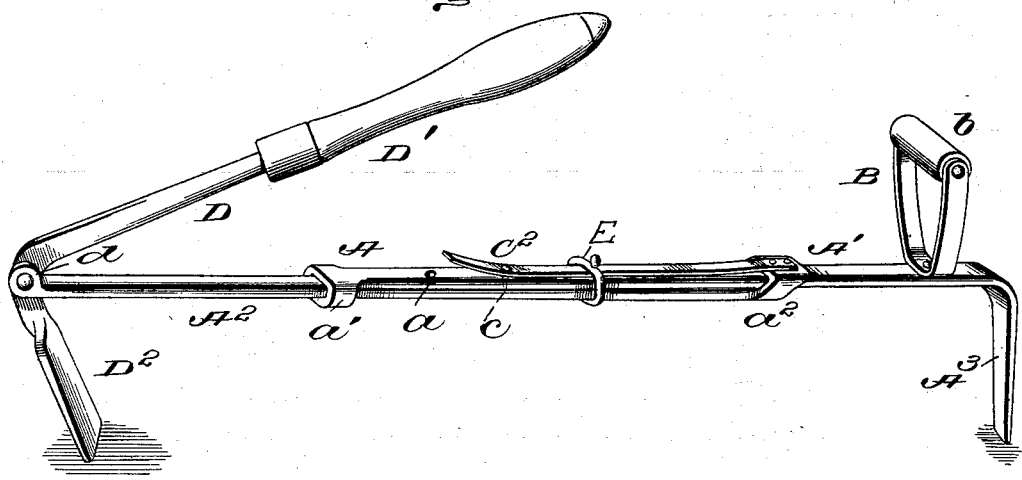

No. 657,294. Patented Sept. 4, 1900.
W. A. NORCROSS.
DEVICE FOR HANDLING BRICKS.
(Application filed Dec. 28, 1899.)

(No Model.)

Witnesses  
William A. Norcross, Inventor  
by J. T. Johnson  
Attorney

UNITED STATES PATENT OFFICE.

WILLIAM A. NORCROSS, OF DETROIT, MINNESOTA.

DEVICE FOR HANDLING BRICKS.

SPECIFICATION forming part of Letters Patent No. 657,294, dated September 4, 1900.

Application filed December 28, 1899. Serial No. 741,866. (No model.)

*To all whom it may concern:*

Be it known that I, WILLIAM A. NORCROSS, a citizen of the United States, residing at Detroit, in the county of Becker and State of Minnesota, have invented certain new and useful Improvements in Devices for Handling Bricks, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in devices for handling bricks, blocks, or material of similar character.

The invention consists in the construction and novel arrangement of the several parts of the device hereinafter described, illustrated in the drawings, and more particularly pointed out in the claims hereunto appended.

Figure 2:
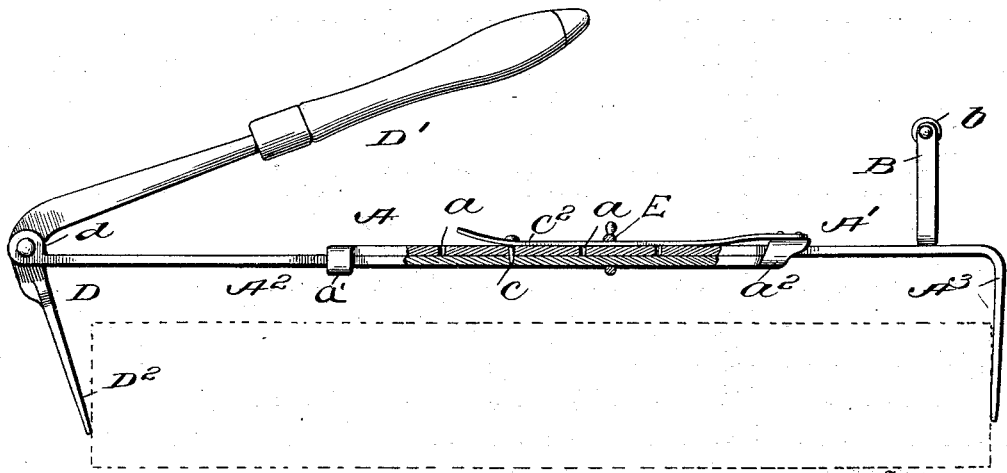

In the drawings, Figure 1 represents a side elevation of the device, showing a brick held therein ready to be handled. Fig. 2 is a similar view having a portion of said two-part bar broken away to show the manner of holding the extensible parts in locked position.

Referring to the drawings by letters, A indicates a two-part bar and consists of the slidable bars $A'$ and $A^2$, slidably or adjustably held to each other by the straps or collars $a'$ and $a^2$, as shown. The bar $A'$ has its outer or free end bent or turned at about a right angle, as shown at $A^3$, and is provided with a suitable handle B, rigidly secured to said bar and having in the ends thereof a suitable grip $b$. In the bar $A'$, between the handle B and the strap or collar $a'$, are a series of slots or recesses $a$, placed at suitable intervals for a purpose hereinafter described. The bar $A^2$ is provided at one end with ears $d$ and at the opposite end with a collar or strap $a^2$. On the upper side of said collar or strap $a^2$ is a spring-fastening $C^2$, rigidly secured thereto and provided on its forward end with a lug or pin $c$, adapted to project through the recesses $a$ in the bar $A'$ and into a recess in the bar $A^2$ for the purpose of holding said bars in desired position. By reason of the parts $A'$ and $A^2$ being slidably connected the device may be adjusted to handle bricks, blocks, &c., of varying sizes. In the forward end of the bar $A^2$, between ears $d$, is pivoted an angle-lever D. This lever is pivoted, preferably, at its angle and is provided with a suitable handle $D'$ and a short wide leg or bearing $D^2$.

E is a suitable slidable band or collar embracing the bars $A'$ and $A^2$ and the spring-fastening $C^2$ between the straps or collars $a'$ $a^2$ and adapted to be adjusted thereon to hold said spring-fastening in position and securely locked.

The operation of this device is obvious and needs no further description.

Having thus described my invention, what I claim, and desire to secure by Letters Patent, is—

1. The combination with a bar $A^2$ having an angle-lever pivoted at one end thereof, of an angle-bar $A'$ slidably connected to the bar $A^2$, a handle rigidly secured to the angle-bar $A'$, and a spring-arm having one end secured to the inner end of one of the bars $A'$ or $A^2$ and the other end of said spring-arm provided with a pin adapted to enter corresponding holes in said bars $A'$ and $A^2$, whereby the bars are locked together, as set forth.

2. The combination of the bar $A^2$ having an angle-lever pivoted at one end and the slidable angle-bar $A'$ provided with a rigidly-attached handle said bars slidably connected by encircling collars, with a spring-arm having one end attached to one of said collars and the other end provided with a pin adapted to engage corresponding holes in the bars $A'$, $A^2$, and a slidable band or collar for holding said spring-arm in locked engagement with the bars, as set forth.

In testimony whereof I affix my signature in presence of two witnesses.

WILLIAM A. NORCROSS.

Witnesses:
W. W. ROSSMAN,
W. R. MORTON.